United States Patent [19]
Chew

[11] 3,992,809
[45] Nov. 23, 1976

[54] HYDROPONIC UNIT

[76] Inventor: Clarence E. Chew, 1840 Townsend Blvd., Jacksonville, Fla. 32211

[22] Filed: May 12, 1975

[21] Appl. No.: 576,547

[52] U.S. Cl. ........................................ 47/62; 47/80
[51] Int. Cl.² ........................................... A01G 7/02
[58] Field of Search ............... 47/1.2, 38, 38.1, 48.5

[56] References Cited
UNITED STATES PATENTS

| | | | |
|---|---|---|---|
| 2,306,027 | 12/1942 | Swaney | 47/1.2 X |
| 3,323,253 | 6/1967 | Robins | 47/1.2 |
| 3,451,162 | 6/1969 | Rasmussen | 47/1.2 |
| 3,550,319 | 12/1970 | Gaines, Jr. | 47/1.2 X |

*Primary Examiner*—Edgar S. Burr
*Assistant Examiner*—James R. Feyrer
*Attorney, Agent, or Firm*—Edwin E. Greigg

[57] ABSTRACT

The invention relates to a relatively small, compact, easily disassemblable, hydroponic unit which comprises superposed telescopic trays one of which is provided with a free flowing liquid that may be transported by a pump positioned in the lower tray to an upper aggregate supporting tray by a suitable conduit whereupon it may thoroughly moisten the extent of the aggregate and flow back to the lower tray. The structure further includes suitable timer means for controlling nutrient flow as well as facilitating removal of the pump from the lower tray without disturbing the aggregate.

9 Claims, 3 Drawing Figures

U.S. Patent
Nov. 23, 1976
3,992,809
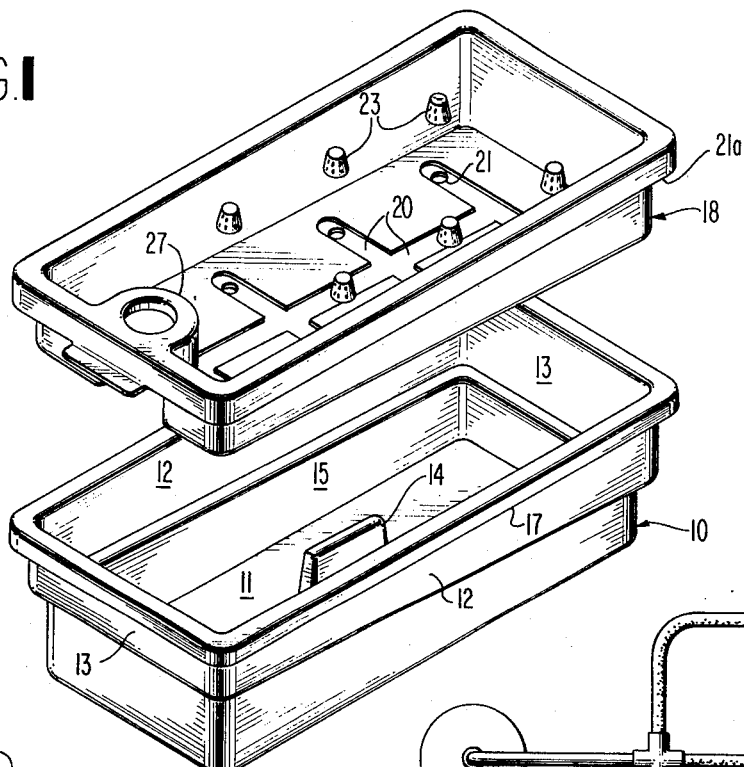
FIG.1
FIG.3
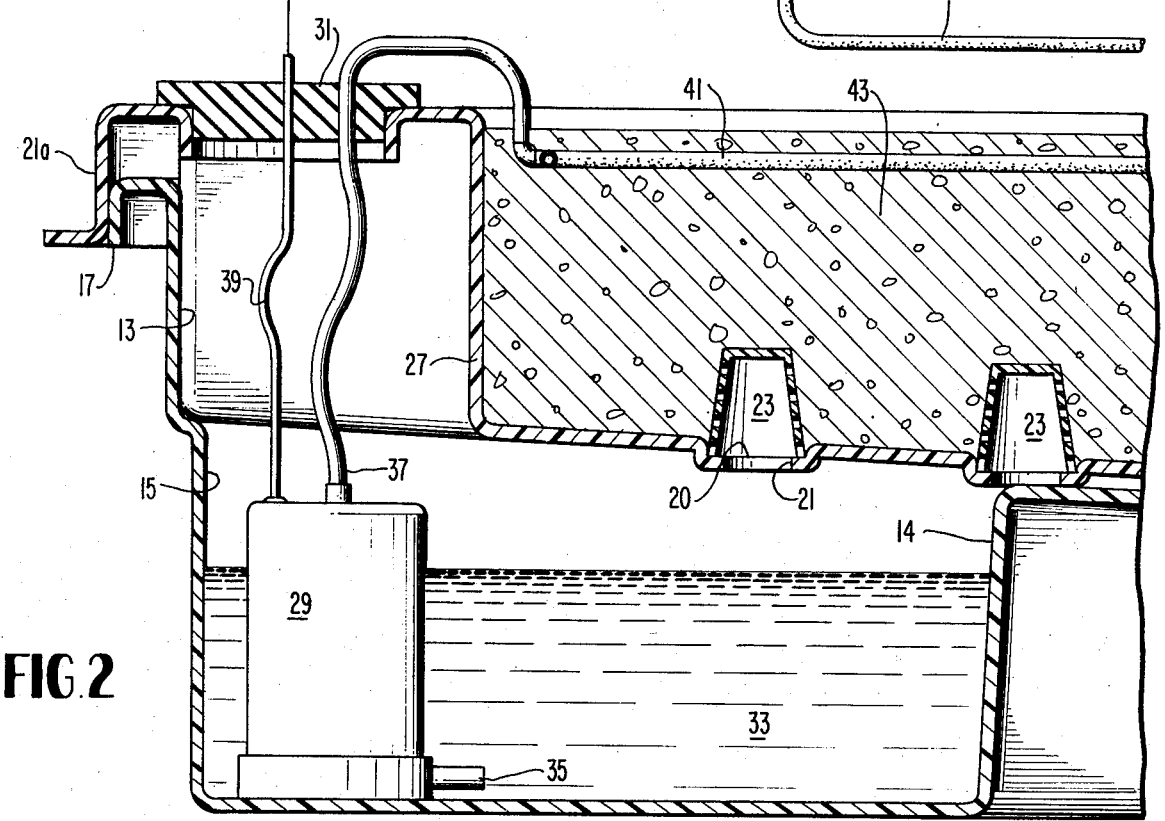
FIG.2

HYDROPONIC UNIT

BACKGROUND OF THE INVENTION

The invention relates generally to devices for growing horticultural products hydroponically. These devices can be characterized in that the growing area contains an aggregate in which the product is grown. Liquid nutrient is supplied at predetermined intervals to nourish the vegetable, fruit, plant, etc.

Such systems are well known. Described in U.S. Pat. No. 3,323,253 is a hydroponic unit in which nutrient is fed to the bottom of the growing chamber. On the one hand this system minimizes plant disturbance while nourishing with a bottom feeding technique, additionally avoiding leaf spotting, etc., since the nutrient never touches the exposed portion of the plant, but this system is inefficient in that only the root structure extending to the nutrient is capable of assimilating the food. The remaining root structure goes mainly unused, and substantial difficulties can be experienced when a variety of plants having different root lengths are planted in the same unit, by virtue of this bottom feeding technique.

SUMMARY OF THE INVENTION

Accordingly, it is an object of the present invention to provide a hydroponic structure in which the root structure is utilized to the maximum extent while feeding.

Additionally, it is an object of this invention to provide an apparatus in which plants having different root lengths are compatible in a single unit and are assured of receiving adequate nutrient.

It is another object of the invention to provide the foregoing while assuring the exposed foliage does not become burned by the nutrient, so as to avoid blemishing the leaf structure.

Yet another object is to provide a system which nourishes the plants economically and efficiently, and one in which maintenance is minimal and easy to perform.

Still another object of the invention is to be able to remove the pump from the nutrient-containing tray for repair or placement without disturbing the growing plants.

The invention will be better understood as well as further objects and advantages will become more apparent from the ensuing detailed specification taken in conjunction with the drawing.

BRIEF DESCRIPTION OF THE DRAWING

FIG. 1 is a perspective view of the hydroponic container assemblage with the elements comprising the same shown in spaced relation;

FIG. 2 shows schematically a portion of the containers in nested relation with the nutrient circulating system also depicted; and FIG. 3 shows a partial top plan view of the irrigation system of FIG. 2.

DESCRIPTION OF THE PREFERRED EMBODIMENT

As contrasted with the prior art, it will be appreciated, from an examination of the drawings, that this apparatus utilizes a top feeding system for providing nutrient and has other further advantages that will become apparent as the description progresses.

Turning now to FIG. 1, there is shown a lower rectangular receptacle 10 preferably made of plastic or fiberglass having a bottom 11, side and end walls 12 and 13, respectively, an internally disposed, upwardly extending support member 14 and an inwardly offset wall 15, the purpose of which will be described later herein. This lower receptacle is further provided with an outwardly extending flange that terminates in a downward turned lip 17 upon which the upper tray 18 that also includes a complementally formed flange 21a is arranged to be received. The upper tray 18 is further supported at the perimeter of its bottom surface by the shelf wall formed by the conjunction of walls 13 and 15 additionally by the support member 14 the upper surface of which is canted dowwardly from left to right as viewed in the drawings in order to provide a surface that is complemental to the exterior bottom wall of the upper tray.

The bottom of the upper tray 18 is provided with an intercommunicating system of troughs 20 with means defining apertures 21 therein. Disposed in these apertures are suitable filters 23 whose function will be explained hereinafter.

Lip 21a of the upper tray is formed complementally to lip 17 of the lower receptacle 10 and together with the snugly fitting telescopically formed walls of the upper and lower trays forms a seal to prevent evaporation of the nutrient from the lower tray. Integral to the upper tray 18 is a passageway 27 which offstands inwardly from one wall thereof and provides for communication with the lower receptacle 10 for a purpose that will be better understood as the description progresses.

FIG. 2 shows the assembled units and the circulation system in detail.

Passageway 27 is disposed directly over fluid pump 29, and is provided with a protective cap 31. The conduit is large enough to permit the pump to pass therethrough so that it may be repaired, etc., without disturbing the growing plants. Pump 29 scavenges nutrient 33 located at the base of receptacle 10 through inlet 35 and pumps the nutrient to the plant supporting bed at the top of the tray 18 via conduit 37. The power cord 39 also extends upwardly through passageway 27 and is arranged to energize the pump. Additionally, cord 39 may be suitably connected to a timer 40 which actuates the pump. Outlet conduit 37 communicates with a soaker system which consists of a network of porous plastic irrigation tubing 41 marketed by DuPont under the tradename VIAFLO. This tubing may be placed about one inch below the surface of the aggregate as shown in FIG. 2, or merely permitted to lie on the surface of the aggregate between the plants.

In operation, nutrient is caused to flow from the receptacle 10 upwardly to the aggregate 43 via pump 29. From there it is allowed to be dispersed slowly through tubing 41 to assure uniform feeding of the plant life. Excess nutrient is collected in trough system 20 (FIG. 1) where it passes through suitably perforated filters 23. The filters assure that particulate matter will be retained in the tray, thereby protecting the pump, while the nutrient runoff is recollected in receptacle 10. An additional filter, located at pump inlet 35 is not shown but may be included. It is, of course, to be understood that by merely removing the cap 31 additional nutrient may be added to the reservoir through passageway 27 as well as access being had to the pump area.

Although rectangular containers are depicted, any other shaped container is suitable.

From the foregoing it will be appreciated that the described system assures thorough feeding of all plant root systems in the aggregate and further provides an efficient means for liquid recirculation, and system maintenance.

What is claimed is:

1. A hydroponic unit comprising an elongated first receptacle having top and bottom walls and upstanding integral side and end walls, an intermediate inwardly offset wall, an aggregate tray arranged to be supported on said inwardly offset wall and by the top edges of said side and end walls in which an aggregate is to be supported for a crop to be grown, a reservoir between said tray and said bottom wall, a plurality of means defining openings in said tray, at least one of said last named means having filter means for preventing entry of said aggregate into said reservoir and to facilitate circulation of atmospheric air to said aggregate, a pump in said reservoir positioned below one of said opening in said tray, means extending upwardly through said aggregate serving as an access to said reservoir and said pump, and nutrient soaker means extending from said pump to the top position of said aggregate to provide nutrient circulation in said hydoponic unit.

2. A hydroponic unit as claimed in claim 1, in which the top portion of said inwardly offset wall comprises a continuous uninterrupted shelf area which serves to support the tray, the bottom of which is at a predetermined slope relative to a horizontal plane so that the nutrient readily flows toward the filter means to be returned to the reservoir.

3. A hydroponic unit as claimed in claim 1, in which the said inwardly offset wall is arranged to receive the perimetric bottom edge of said tray having upstanding walls that are formed complementally adjacent to the upstanding walls of the first said receptacle, providing a mating fit of said tray above said first said receptacle when said unit is assembled.

4. A hydroponic unit as claimed in claim 1, in which the means serving as an access to said reservoir comprises a vertically extending passageway defined by said tray.

5. A hydroponic unit as claimed in claim 4, in which said access means offstands inwardly from one wall and includes a cover element for the upper terminal extremity thereof.

6. A hydroponic unit as claimed in claim 4, in which the access means includes tubular means extending therethrough which serves to transport nutrient from the reservoir to said soaker means.

7. A hydroponic unit as claimed in claim 1, in which the pump is actuated by a variable timer.

8. A hydroponic unit as claimed in claim 1, in which said tray is additionally supported by a member extending upwardly from said bottom wall of said receptacle.

9. The hydroponic unit as claimed in claim 1, in which the first receptacle is made of plastic.

* * * * *